US010387297B1

(12) United States Patent
Elgarat et al.

(10) Patent No.: US 10,387,297 B1
(45) Date of Patent: Aug. 20, 2019

(54) SYSTEM, METHOD, AND COMPUTER PROGRAM FOR END-TO-END TEST MANAGEMENT OF A SOFTWARE TESTING PROJECT

(71) Applicant: Amdocs Development Limited, Limassol (CY)

(72) Inventors: Sharon Elgarat, Kibbutz Mefalsim (IL); Shay Cohen, Singapore (SG); Rafi Massarwa, Singapore (SG)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 102 days.

(21) Appl. No.: 15/615,569

(22) Filed: Jun. 6, 2017

Related U.S. Application Data

(60) Provisional application No. 62/350,656, filed on Jun. 15, 2016.

(51) Int. Cl.
*G06F 11/36* (2006.01)
*G06F 9/445* (2018.01)
*G06Q 10/06* (2012.01)

(52) U.S. Cl.
CPC ...... *G06F 11/3696* (2013.01); *G06F 9/44589* (2013.01); *G06F 11/3664* (2013.01); *G06F 11/3684* (2013.01); *G06F 11/3688* (2013.01); *G06F 11/3692* (2013.01); *G06Q 10/063* (2013.01); *G06Q 10/0633* (2013.01)

(58) Field of Classification Search
CPC ............. G06F 11/3688; G06F 9/44589; G06F 11/3664
USPC .......................................... 717/124, 125, 126
See application file for complete search history.

(56) References Cited

U.S. PATENT DOCUMENTS

| 5,949,999 | A | 9/1999 | Song et al. |
| 7,810,070 | B2 * | 10/2010 | Nasuti ................. G06F 11/3688 717/124 |
| 7,849,438 | B1 * | 12/2010 | Hemmat ................. G06Q 10/06 717/102 |
| 7,941,721 | B2 | 5/2011 | Priel et al. |
| 8,635,624 | B2 | 1/2014 | Subramanya et al. |
| 9,032,373 | B1 * | 5/2015 | Gupta ................. G06F 11/3688 717/127 |
| 9,092,578 | B2 | 7/2015 | Wefers |

(Continued)

FOREIGN PATENT DOCUMENTS

WO 2013131186 A1 9/2013

OTHER PUBLICATIONS

Kull et al., "End-to-End Testing Automation in TTCN-3 environment using Conformiq Qtronic™ & Elvior MessageMagic" (Year: 2009).*

(Continued)

*Primary Examiner* — Phillip H Nguyen
(74) *Attorney, Agent, or Firm* — Zilka-Kotab, P.C.

(57) ABSTRACT

A system, method, and computer program product are provided for end-to-end test management of a software testing project. In operation, a plurality of test architectures associated with at least one software testing project are configured. Further, a plurality of test environments are generated from the plurality of test architectures. Additionally, the plurality of test environments are published to a Web Server associated with a test management system. Moreover, information associated with the plurality of test environments is displayed.

9 Claims, 6 Drawing Sheets

(56) References Cited

U.S. PATENT DOCUMENTS

| | | | |
|---|---|---|---|
| 2002/0172931 A1 | 11/2002 | Greene et al. | |
| 2005/0229043 A1* | 10/2005 | Nasuti | G06F 11/3688 714/38.1 |
| 2009/0307763 A1* | 12/2009 | Rawlins | G06F 9/44505 726/5 |
| 2013/0305210 A1 | 11/2013 | Sharma et al. | |
| 2014/0109052 A1 | 4/2014 | Tempel et al. | |
| 2014/0156852 A1 | 6/2014 | Moon | |
| 2014/0165043 A1* | 6/2014 | Pasala | G06F 11/3684 717/124 |
| 2014/0380278 A1* | 12/2014 | Dayan | G06F 11/3692 717/124 |
| 2015/0161029 A1 | 6/2015 | Rapp | |
| 2016/0044520 A1* | 2/2016 | Iyer | H04W 24/08 370/252 |

OTHER PUBLICATIONS

Gao et al., "Testing as a Service (TaaS) on Clouds" (Year: 2013).*
Wing Lam, "Testing E-Commerce Systems: A Practical Guide" (Year: 2001).*

* cited by examiner

FIGURE 4

SYSTEM, METHOD, AND COMPUTER PROGRAM FOR END-TO-END TEST MANAGEMENT OF A SOFTWARE TESTING PROJECT

CLAIM OF PRIORITY

This application claims the benefit of U.S. Provisional Application No. 62/350,656, filed Jun. 15, 2016, the entire contents of which are incorporated herein by reference.

FIELD OF THE INVENTION

The present invention relates to software testing, and more particularly to end-to-end management of such software testing.

BACKGROUND

Companies strive to promote changes to their live systems through testing projects so quality in such systems can be assured. Each testing project requires non-production test environments in which the project can be tested according to the required solution. According to the characteristics of the project, the testing team must request access to test environment resources that will support the provided solution. Customers often challenge a test manager's decision of required systems, determined to know about the end-to-end limits of the test and the interfaces being used.

The duration of testing projects can vary between several months for larger changes, and several hours for extremely small and pin-pointed changes. A testing project cannot be completed without the correct resources. Therefore, projects that cannot quickly identify required needs and obtain access to the relevant systems will face delays.

Companies invest in the purchasing of hardware and also in virtualizing test environments on top of such hardware. Although a set of test environments is setup for some elements that are more commonly used, there are always additional elements from which only a single resource is available. Therefore, a full end-to-end test environment is a unique setup, highly in demand by multiple projects.

The lack of a clear view of the impacted systems by each requirement creates an even higher demand for the end-to-end environment as test managers and customers are never sure they have all required elements, unless they have a fully integrated environment. Investigations performed into the reasons projects are not meeting their milestones show an alarming rate of projects that had delays as a result of unavailable environment element resources at the time the project was ready to start. Further investigation shows that with proper management such delays can be avoided, but to achieve this there is a need for clear visibility into the state of the solution and a proper booking mechanism of each element to projects.

The investigation shows projects go into delay even when utilization of the environments is low, as the environment is reserved to a project that needs it only occasionally but has booked the environment for a long period, or has issues with other systems that prevent the ability to use this element, while the other project had no such dependencies and could have utilized the environment if a proper management tool had been in place.

There is thus a need for addressing these and/or other issues associated with the prior art.

SUMMARY

A system, method, and computer program product are provided for end-to-end test management of a software testing project. In operation, a plurality of test architectures associated with at least one software testing project are configured. Configuring the plurality of test architectures includes configuring multiple test architectures that are each made of one or more entities, and configuring details required for each entity type associated with the one or more entities. Further, a plurality of test environments are generated from the plurality of test architectures. Additionally, the plurality of test environments are published to a Web Server associated with a test management system. Moreover, information associated with the plurality of test environments is displayed to allow users to view an end-to-end environment associated with the at least one software testing project including: showing architecture level status as result of a large amount of tests for all elements participating in the end-to-end environment and providing a real time access to view a state and effectiveness of testing resources associated with the at least one software testing project; highlighting a status per business flow to allow users to prioritize tests in partially functioning environments while still focusing on end-to-end tests; and highlighting a status per requirement to provide users an ability to prioritize projects in partially functioning environments.

BRIEF DESCRIPTION OF THE DRAWINGS

FIG. 4 shows an example of a user interface screen for a system under test, in accordance with one embodiment.

DETAILED DESCRIPTION

Figure 1:
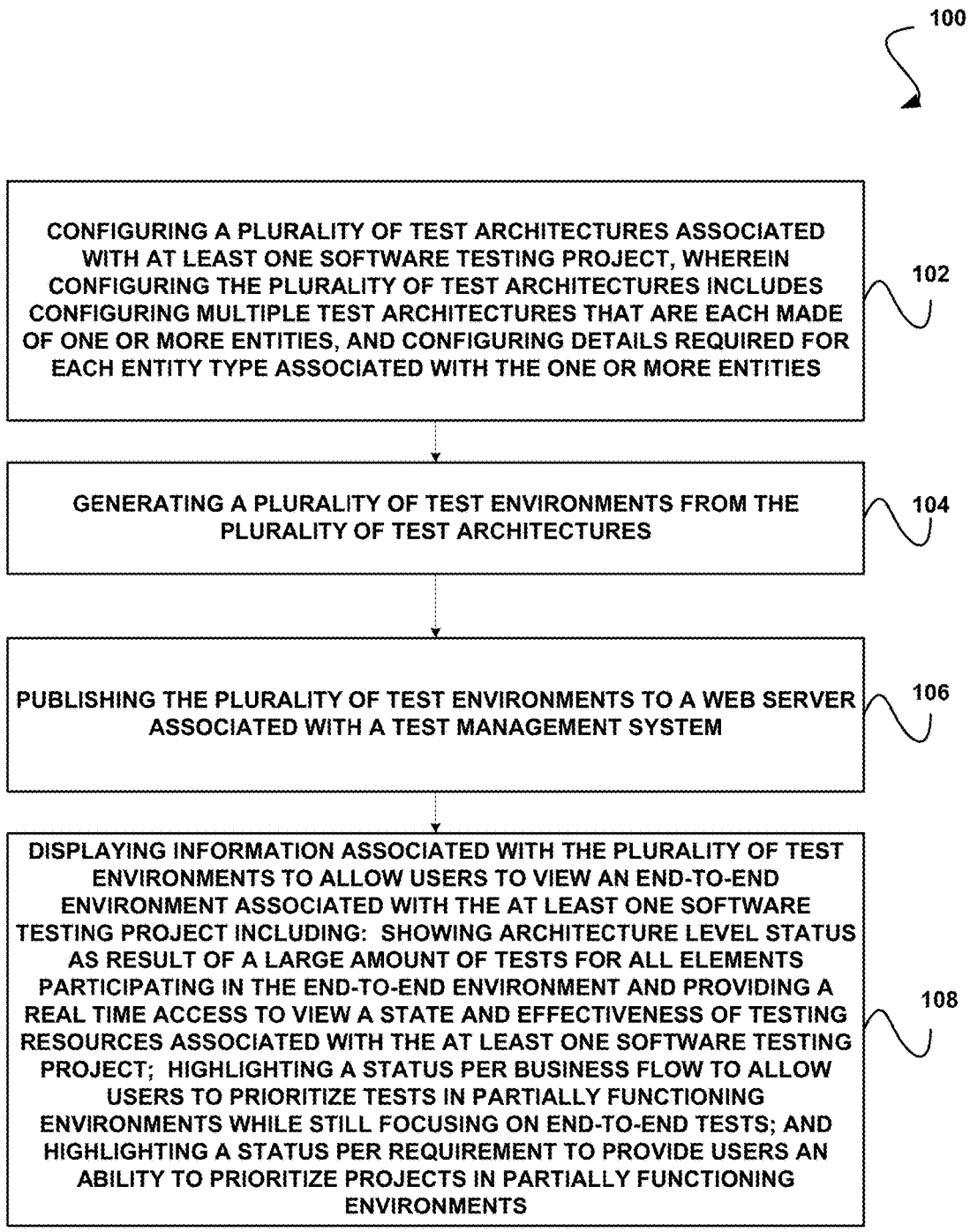
FIG. 1 illustrates a method for end-to-end test management of a software testing project, in accordance with one embodiment.

FIG. 1 illustrates a method 100 for end-to-end test management of a software testing project, in accordance with one embodiment.

As shown, a plurality of test architectures associated with at least one software testing project are configured. See operation 102. Configuring the plurality of test architectures may include configuring multiple test architectures that are each made of one or more entities representing one or more applications, servers, databases, software applications, and/or interfaces between the different components associated with the at least one software testing project, and configuring details required for each entity type associated with the one or more entities.

Further, a plurality of test environments are generated from the plurality of test architectures. See operation 104. Additionally, the plurality of test environments are published to a Web Server associated with a test management system. See operation 106.

Moreover, information associated with the plurality of test environments is displayed to allow users to view an end-to-end environment associated with the at least one software testing project including: showing architecture level status as result of a large amount of tests for all elements participating in the end-to-end environment and providing a real time access to view a state and effectiveness of testing resources associated with the at least one software testing project; highlighting a status per business flow to allow users to prioritize tests in partially functioning environments while still focusing on end-to-end tests; and highlighting a status per requirement to provide users an ability to prioritize projects in partially functioning environments. See operation 108.

Additionally, in one embodiment, displaying information associated with the plurality of test environments to allow the users to view the end-to-end environment associated with the software testing project may further include providing architecture level real time status based on predefined automated test cases. In another embodiment, displaying information associated with the plurality of test environments to allow the users to view the end-to-end environment associated with the software testing project may further include providing a status of connectivity between elements of the software testing project based on multi-level tests confirming an interface supports communication from a base connection to full business value.

It should be noted that the users may include any party involved with activities associated with test environments corresponding to the software testing project, such as a customer, a vendor providing code, an information technology (IT) support group, and/or a testing group, etc.

It should be noted that the method 100 may be implemented utilizing various systems (e.g. the test management system of FIG. 2, etc.), hardware, software, applications, user interfaces, etc., as dictated by the implementer. For example, the method 100 may be implemented by a test management system that includes one or more processors, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
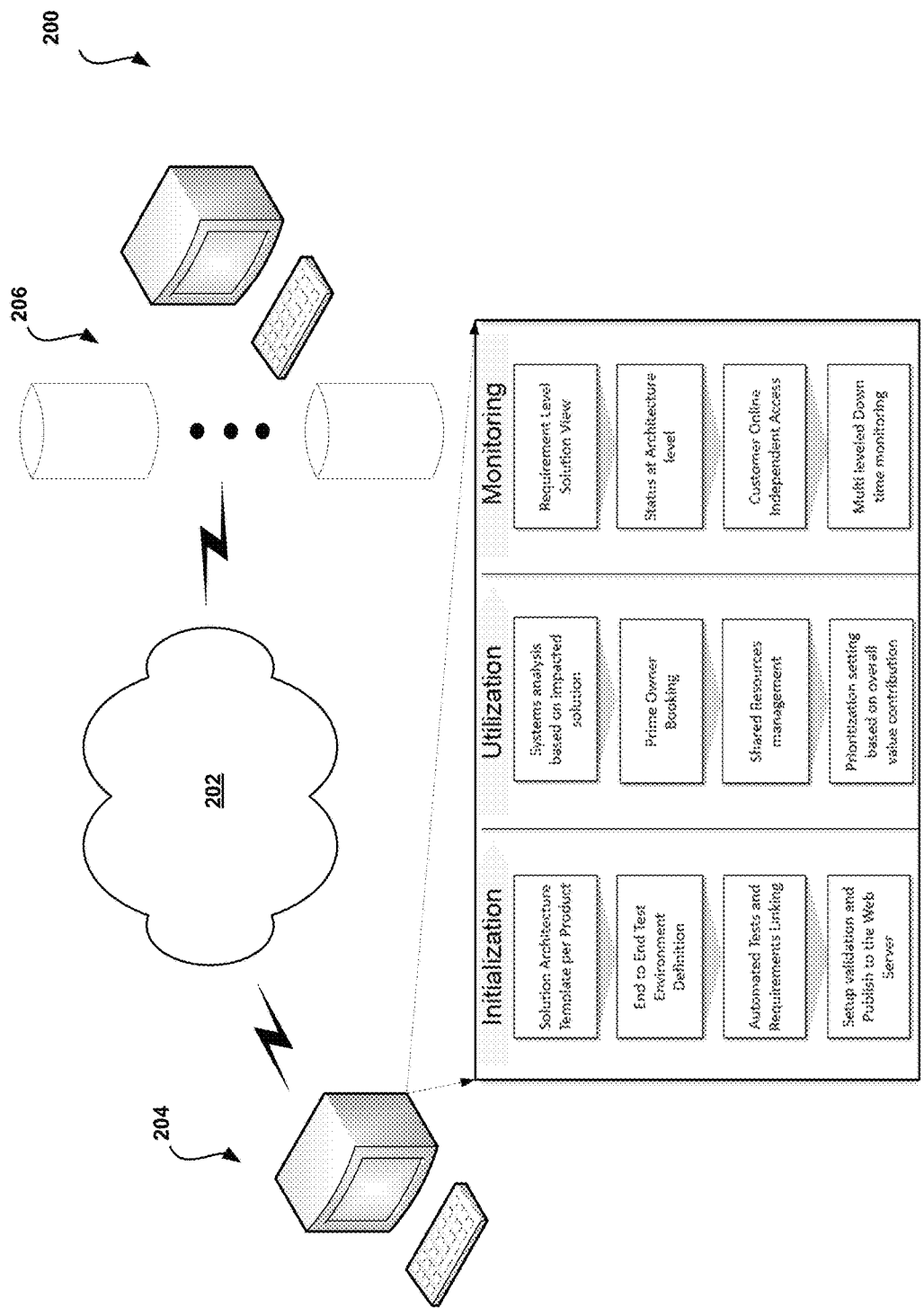
FIG. 2 shows a system diagram for end-to-end test management of a software testing project, in accordance with one embodiment.

FIG. 2 shows a system 200 for end-to-end test management of a software testing project, in accordance with one embodiment. As an option, the system 200 may be implemented in the context of the details of FIG. 1 and/or any subsequent figure(s). Of course, however, the system 200 may be implemented in the context of any desired environment. Further, the aforementioned definitions may equally apply to the description below.

As shown, the system 200 includes a test management system 204 that is in communication with a system under test 206, either directly, or over one or more networks 202.

Some of the largest challenges in delivering multiple projects in parallel come from the ability to operate test environments, the ability to determine the right structure needed to test a requirement, and managing the utilization of the existing resources to maximize the value coming out of each environment element.

The test management system 204 provides a customer a combined view of all environment elements in a single layout, joining resources from multiple vendors to generate a full architecture view. The test management system 204 utilizes automated test scripts to allow a test management dashboard to show real Working-Faulted status and not just Up-Down status as most monitoring tools provide.

The test management system 204 provides the viewer an ability to see which requirements impact each element in the connected architecture, to give clarity to the minimal end-to-end test required. The test management system 204 clarifies and indicates to customers the end-to-end limits of the system under test 206.

The test management system 204 also combines both basic detail tracking capabilities and booking abilities, which helps optimize environment utilization and gives a test environment manager the capability to control allocation based on priority from a customer value perspective, while introducing the ability to share resources or handle immediate exceptions. These joint capabilities provide a test environment management platform which eliminates one of the top risk contributors to project deployments to enable short time to value at high testing quality, as the correct environment elements are available for the testing team of each of the projects executed in parallel.

With respect to architecture setup, the test management system 204 allows the user to configure multiple solution architectures, which may each be made of entities representing applications, servers, and databases, etc. The user may link between the entities using the test management system 204, thus defining interface entities. The user is able to use the test management system 204 to configure the details needed for each entity type.

The test management system 204 may also allow the user to define an architecture with no predefined settings, or the test management system 204 may provide an initial template for the definition of each test environment. The template may be defined per product, providing an architecture map according to the systems under test in the product and the satellites to which the product expects to be connected. A template may be modified by the user to fit a project's needs.

With respect to environment setup, the test management system 204 allows the user to generate test environments from an architecture. The final definition of each element in the architecture is set at the environment level, populating the properties of the entity according to the physical or virtualized entity it represents.

As multiple environments may require definition, and not all environments might include all solution architecture elements, the test management system 204 may allow the user to choose which elements are included in each environment, thus generating a different architecture map for each test environment according to the actual content of the environment.

The test management system 204 may support defining of each element in the solution as an entity such that if changes are needed in the environment content, elements could be moved from one test environment to the other without a need to redefine the element.

The test management system 204 may allow the user to link to entities in an environment automated tests to allow measuring the status of the entity. The tests may be linked to any type of entity in the solution. The status of the entities in the architecture is defined as the combined status of all automated test scripts linked to the entity.

Business flows may be defined in the test management system 204 as a chain of tests crossing between multiple linked entities which represent an end-to-end chain required to test a complete business activity. Examples of such business flows include product activation flow, usage consumption and billing flow, and customer payment flow, etc.

A set of requirements may be linked to entities in the environment according to the impact assessment made for the requirements. The requirements may also be classified for specific business flows of which the systems linked are a part.

An environment setup by a client user of the test management system 204 may be published to a Web Server of the test management system 204. A set of permissions may be set to allow additional users who do not have client access to the test management system 204 to view and refresh status of the test environments without dependency on the testing team.

Customer representatives and additional vendors beyond the testing group may be given access to view the solution scope being tested by each project, the current online status of the solution, and the impacted requirements and business flows it enables the testing team to test.

Once an environment has been setup, the test management system 204 may allow its users to view the solution, investigate the proper minimal end-to-end architecture needed to perform a high quality testing project and request booking for elements of the environment, specifying the exact dates each element is needed. The decision may be made by the test manager and may be exposed to the customer through the test management system 204, highlighting all elements requested for a project to allow the customer a clear understanding of the portion of the architecture being tested and its proper coverage of the related business flows.

An administrator associated with the test management system 204 may control the final booking decision. Users may also be able to request that they be added as sharing users, after coordinating with the current owner. This allows multiple parallel projects to have controlled and coordinated access to the environments, while still keeping a clear chain of ownership.

A customer may utilize the booking information to track current and future projects that are being tested with the proper coverage of applications and interfaces and ensure that no vendor is delaying projects from their timely delivery with aged blocking issues in an application or interface associated with the user's responsibility.

An environment manager may utilize the booking information to assist in notification procedures for systems that must schedule maintenance windows or face an unexpected crash. The environment manager may utilize the booking information to set immediate timeslots for urgent exception projects defined by the customer as a top priority, which require an element for a very specific timeslot that could not be planned ahead of time.

The environment manager may utilize the booking historical information to identify utilization patterns that are too high or too low, which may indicate added resources are needed from a plurality of elements, while other resources may be released. This maximizes the value received from the virtualization of existing customer hardware with the test environments built on top.

Test managers may utilize the booking information to track the items they require and plan projects based on environment true availability. When re-planning due to delays, the test manager may use the test management system 204 to properly explain the need for delay, showing the business flows that are expected to be tested alongside with the availability of entities which participate. Test managers may utilize the booking information to coordinate shared activities, thus reducing dependency on standalone ownership and promoting the parallel ability to deploy multiple projects.

With respect to monitoring, the test management system 204 will present the status of each element and each interface connecting elements as a result of a predefined automated test executed by the test management system 204 and report back. The test management system 204 will present the status of all environment elements in a single view representing graphically the success or failure status from the test. This presents the user with a Working-Faulted status of an environment at any point in time.

The test management system 204 may also highlight specific business flows at the demand of a user to present an overall status of the business flow, indicating the testing projects on which the flow can work, or whether the business flow is currently impacted by errors.

The test management system 204 may also present a highlighted status of a specific requirement or requirement set, presenting the status of the systems and interfaces needed to test the requirements to help prioritize projects according to the ability to perform tests, and provide managers and customers abilities to avoid running tests in known faulted systems and re-plan based on effective environments availability. The highlighted items may be based on directly linked entities or based on all entities participating in the business flows to which the requirement is assigned.

The automated test being executed may be at connectivity level representing the basic communication capability between the systems under test. The automated test may also show a result of an internal test for the system under test, confirming the system's basic internal function works. The automated test may also show a result of a longer integration chain to indicate if end-to-end chains of data flow or partial data flows are properly processed.

Testing users may utilize the monitoring information to report new basic environment issues without facing downtime from long investigation of unexpected environment faults. Test managers may utilize the monitoring information to reallocate testers between testing tasks to better utilize the available human resources and work on areas that are not blocked by known environment issues the system reflects.

The administrator of the test management system 204 may utilize the monitoring information to reprioritize between projects where the higher priority project is blocked by issues. The administrator of the test management system 204 may also utilize the monitoring information to make decisions on moving elements in an environment to another environment in the case that the moved element will work but other elements in the specific environment have issues preventing the testers from working. The administrator of the test management system 204 may also utilize the monitoring information, in all of its possible levels, to collect downtime statistics and analyze repeated environment issues to install prevention measures to eliminate repeated issues or minimize their impact.

Thus, the test management system 204 has the ability to show architecture level status as result of a large amount of tests for all elements participating in the end-to-end environment. Additionally, the test management system 204 provides Web access to customers to show architecture level status, thus improving customer experience with a new understanding of the tested solution and offering a real time access to understand the state and effectiveness of testing resources.

The test management system 204 also provides highlighting status per business flow, thus providing managers with the ability to prioritize tests in partially functioning environments, while still focusing on end-to-end tests. The test management system 204 also provides highlighting status per requirement, thus providing a TEM with the ability to prioritize projects in partially functioning environments, pushing more projects to production early.

The test management system 204 also provides the ability to re-prioritize booking based on environment status, to increase effective utilization. Thus, the test management system 204 provides management capability for all aspects of environment transforms and is a holistic test environment management tool.

Figure 3:
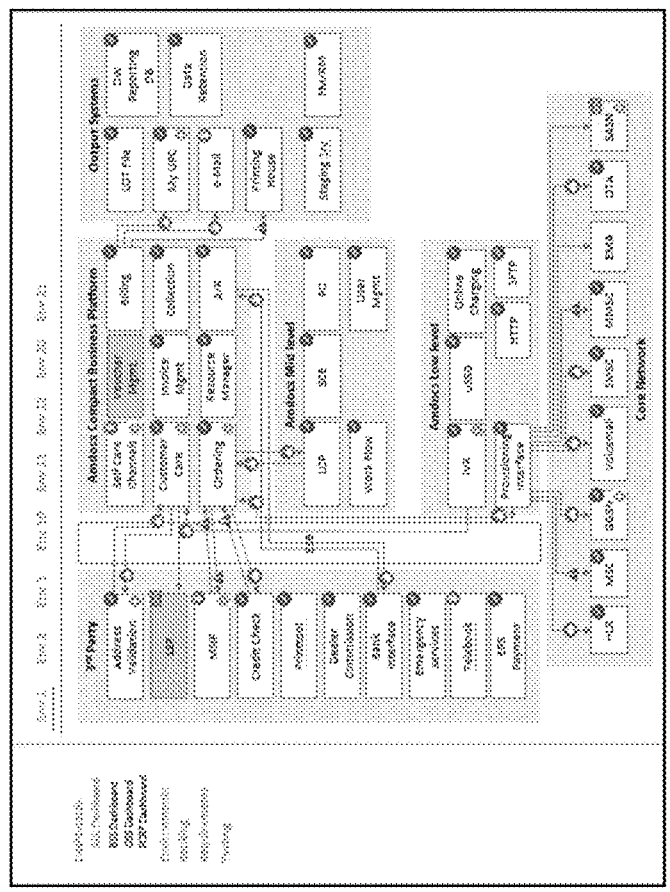
FIG. 3 shows an example of a user interface screen for a system under test, in accordance with one embodiment.

FIG. 3 shows an example 300 of a user interface screen for a system under test, in accordance with one embodiment. As an option, the example 300 may be implemented in the context of the details of the previous figures and/or any subsequent figure(s). Of course, however, the example 300 may be implemented in the context of any desired environment. Further, the aforementioned definitions may equally apply to the description below.

The interface shown in FIG. 3 illustrates a main screen that may be presented by a test management system, in accordance with one embodiment.

Figure 4:
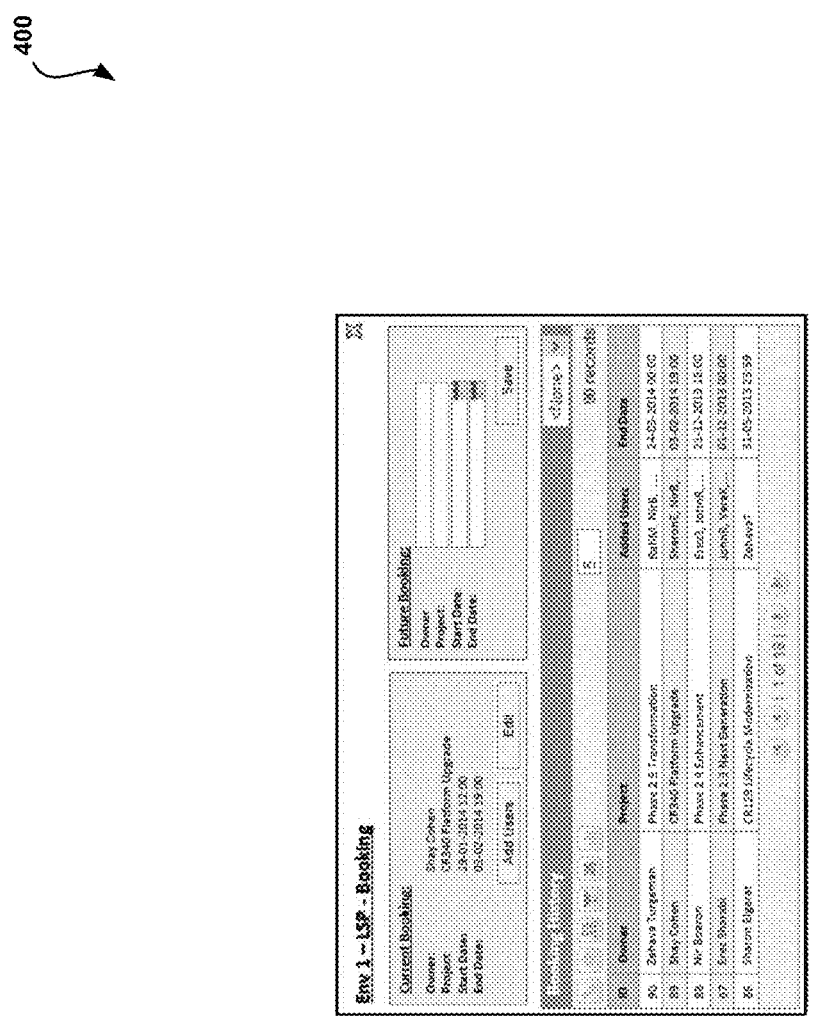

FIG. 4 shows an example 400 of a user interface screen for a system under test, in accordance with one embodiment. As an option, the example 400 may be implemented in the context of the details of the previous figures and/or any subsequent figure(s). Of course, however, the example 400 may be implemented in the context of any desired environment. Further, the aforementioned definitions may equally apply to the description below.

The interface shown in FIG. 4 illustrates how booking information associated with a test management system may be displayed, in accordance with one embodiment.

Figure 5:
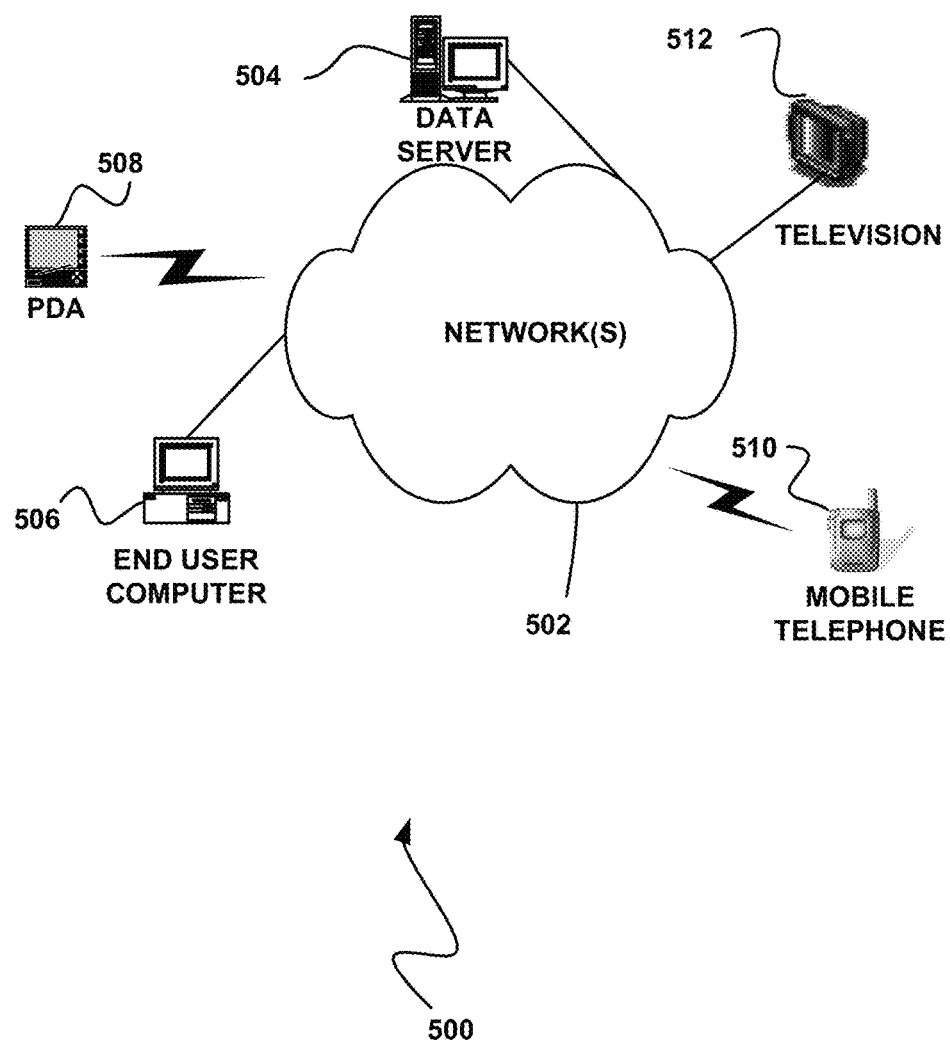
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
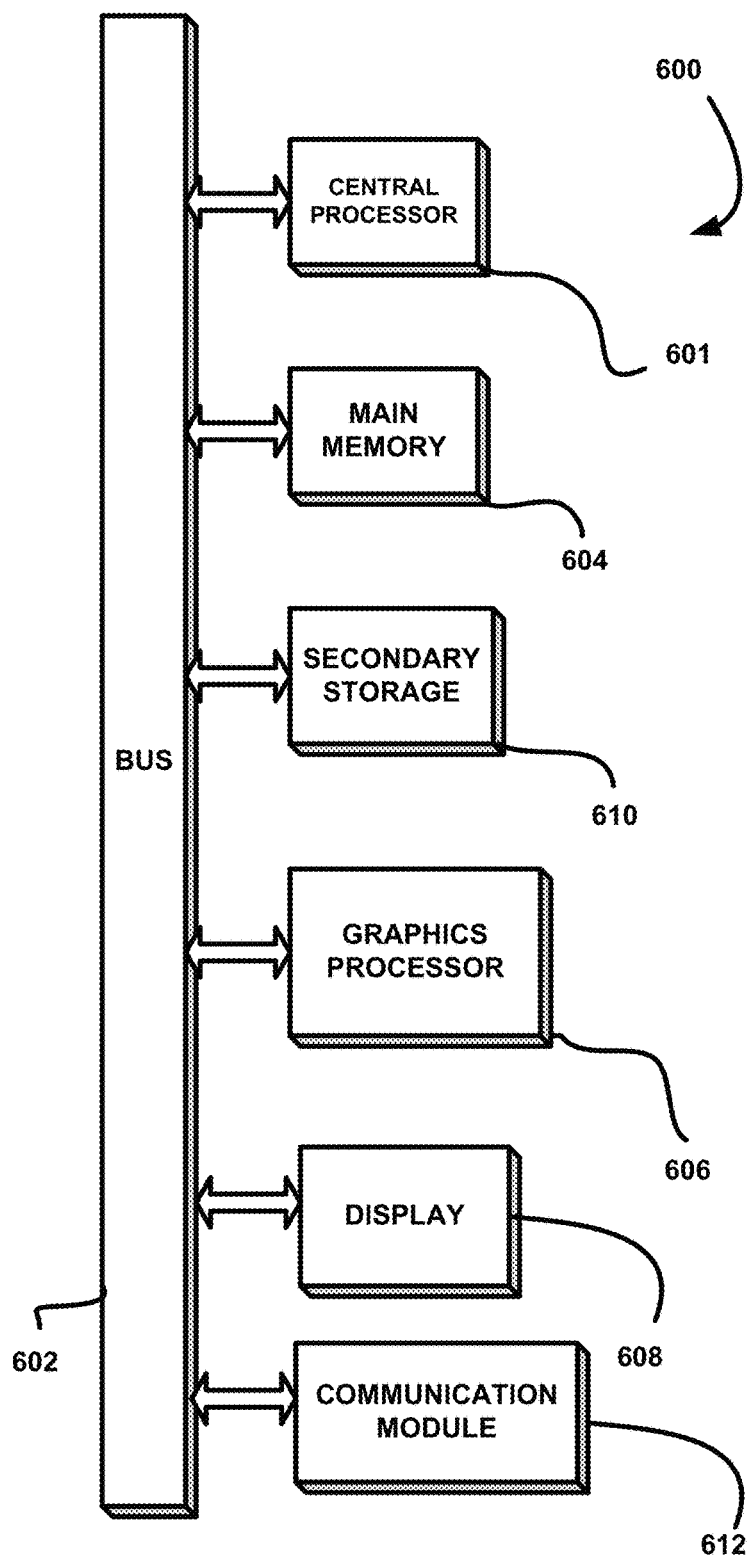
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a test management system from a user, a configuration of a plurality of test architectures associated with a software testing project, each test architecture including entities representing elements including applications, servers, and databases;
   generating, by the test management system, a plurality of test environments from the plurality of test architectures, each test environment indicating properties of the entities included in the test architecture from which the test environment is generated;
   linking, by the test management system, each of the entities in each test environment to one or more automated tests measuring a status of the represented element, wherein an overall status of the element is provided from combining each status measured from the one or more automated tests;
   publishing, by the test management system, the plurality of test environments to a Web Server associated with the test management system;
   monitoring, by the test management system, execution of the one or more automated tests on each of the elements;
   displaying, by the test management system, a graphical user interface presenting a view of an end-to-end environment associated with the software testing project that further:
      receives a user request to book the elements in the plurality of test environments including dates each of the elements is needed and provides a customer with an indication of the request,
      identifies resource utilization patterns to indicate when added resources are needed from the elements and when other resources can be released, and presents the overall status of each of the elements.

2. The method of claim 1, wherein the graphical user interface further presents a status of connectivity between entities of the at least one software testing project based on multi-level tests.

3. The method of claim 1, wherein the one or more entities represent one or more of software applications or interfaces between the different components associated with the at least one software testing project.

4. A computer program product embodied on a non-transitory computer readable medium, comprising computer code for: receiving, by a test management system from a user, a configuration of a plurality of test architectures associated with a software testing project, each test architecture including entities representing elements including applications, servers, and databases;
   generating, by the test management system, a plurality of test environments from the plurality of test architectures, each test environment indicating properties of the entities included in the test architecture from which the test environment is generated;
   linking, by the test management system, each of the entities in each test environment to one or more automated tests measuring a status of the represented element, wherein an overall status of the element is provided from combining each status measured from the one or more automated tests;

publishing, by the test management system, the plurality of test environments to a Web Server associated with the test management system;

monitoring, by the test management system, execution of the one or more automated tests on each of the elements;

displaying, by the test management system, a graphical user interface presenting a view of an end-to-end environment associated with the software testing project that further:

receives a user request to book the elements in the plurality of test environments including dates each of the elements is needed and provides a customer with an indication of the request, identifies resource utilization patterns to indicate when added resources are needed from the elements and when other resources can be released, and presents the overall status of each of the elements.

5. The computer program product of claim 4, wherein the graphical user interface further presents a status of connectivity between entities of the at least one software testing project based on multi-level tests.

6. The computer program product of claim 4, wherein the one or more entities represent one or more of software applications or interfaces between the different components associated with the at least one software testing project.

7. A test management system comprising one or more processors operable for:

receiving, by the test management system from a user, a configuration of a plurality of test architectures associated with a software testing project, each test architecture including entities representing elements including applications, servers, and databases;

generating, by the test management system, a plurality of test environments from the plurality of test architectures, each test environment indicating properties of the entities included in the test architecture from which the test environment is generated;

linking, by the test management system, each of the entities in each test environment to one or more automated tests measuring a status of the represented element, wherein an overall status of the element is provided from combining each status measured from the one or more automated tests;

publishing, by the test management system, the plurality of test environments to a Web Server associated with the test management system;

monitoring, by the test management system, execution of the one or more automated tests on each of the elements;

displaying, by the test management system, a graphical user interface presenting a view of an end-to-end environment associated with the software testing project that further:

receives a user request to book the elements in the plurality of test environments including dates each of the elements is needed and provides a customer with an indication of the request, identifies resource utilization patterns to indicate when added resources are needed from the elements and when other resources can be released, and presents the overall status of each of the elements.

8. The test management system of claim 7, wherein the graphical user interface further presents a status of connectivity between entities of the at least one software testing project based on multi-level tests.

9. The test management system of claim 7, wherein the one or more entities represent one or more of software applications or interfaces between the different components associated with the at least one software testing project.

* * * * *